United States Patent
Sala

(12) 
(10) Patent No.: US 6,494,646 B1
(45) Date of Patent: Dec. 17, 2002

(54) PNEUMATIC CONVEYOR FOR LIGHT-WEIGHT EMPTY BOTTLES

(76) Inventor: Jaime Marti Sala, c/ Emancipació, 8, 08017 Barcelona (ES)

( * ) Notice: Subject to any disclaimer, the term of this patent is extended or adjusted under 35 U.S.C. 154(b) by 0 days.

(21) Appl. No.: 09/646,758

(22) PCT Filed: Jan. 20, 1999

(86) PCT No.: PCT/ES99/00015
§ 371 (c)(1),
(2), (4) Date: Sep. 20, 2000

(87) PCT Pub. No.: WO00/43301
PCT Pub. Date: Jul. 27, 2000

(51) Int. Cl.[7] .................................. B65G 53/16
(52) U.S. Cl. ......................................... 406/88
(58) Field of Search ..................... 406/26, 88

(56) References Cited

U.S. PATENT DOCUMENTS

| | | | |
|---|---|---|---|
| 4,284,370 A | | 8/1981 | Danler et al. |
| 4,500,229 A | | 2/1985 | Cole et al. |
| 4,502,215 A | | 3/1985 | Davis et al. |
| 4,714,151 A | * | 12/1987 | Campbell et al. ........ 198/860.5 |
| 4,822,214 A | | 4/1989 | Aidlin et al. |
| 5,161,919 A | | 11/1992 | Smith et al. |
| 5,246,314 A | | 9/1993 | Smith et al. |
| 5,299,889 A | | 4/1994 | Langenbeck |
| 5,516,239 A | * | 5/1996 | Warren et al. ................. 406/88 |
| 5,630,679 A | * | 5/1997 | Simkowski et al. .......... 406/86 |
| 5,820,306 A | * | 10/1998 | Hilbish et al. ................. 406/88 |
| 6,033,156 A | * | 3/2000 | Marti Sala .................... 406/86 |

FOREIGN PATENT DOCUMENTS

| | | | |
|---|---|---|---|
| CH | 444 034 | 2/1968 | |
| DE | 88 07 146 | 9/1988 | |
| EP | 0790 200 | 8/1997 | |
| EP | 0 831 043 | 3/1998 | |
| FR | 0 705 777 A1 * | 4/1996 | ........... B65G/51/03 |
| GB | 0 070 931 A1 * | 2/1983 | ........... B29C/17/07 |
| WO | WO 90 10587 | 9/1990 | |
| WO | WO 97 35791 | 10/1997 | |

* cited by examiner

Primary Examiner—Joseph E. Valenza
Assistant Examiner—Joe Dillon, Jr.
(74) Attorney, Agent, or Firm—Seed IP Law Group PLLC

(57) ABSTRACT

Pneumatic conveyor for empty, lightweight bottles (1) of the kind incorporating a support flange (2) at an area of their neck (3). Said conveyor comprises a pair of coplanar, spaced apart supporting tracks (5) for supporting said flange (2), a pair of upper guiding tracks (11) opposed to tracks (5), and two bodies (12) arranged therebetween. Bodies (12) comprise passageways (13) communicating at one end with at least a pressurizable chamber (7) and defining at the other end blowing nozzles (6) which expel thrust air jets against the zone of the flange (2) of the bottles (1). The pressurizable chamber (7) is formed by a wrapping (8) easy to dismount, of a flexible and airtight material, such as a tarpaulin. The upper tracks (11) and bodies (12) are joined to the structure (4) by rigid means, while the tracks (5) are joined by elastic means allowing to manually withdraw the clogged bottles (1). Obturating plates serve for regulating the air flow through passageways (13).

17 Claims, 2 Drawing Sheets

PNEUMATIC CONVEYOR FOR LIGHT-WEIGHT EMPTY BOTTLES

SCOPE OF THE INVENTION

This invention relates to a pneumatic conveyor for empty, lightweight bottles of the kind incorporating a support flange at an area of their neck and which are propelled by air jets along supporting and displacing guides.

STATE OF RELATED ART

In the state of the art, different pneumatic conveyors of this kind are well-known, among which those disclosed in patents EP-0 070 931, EP-A-0 705 777, EP-A-0 790 200 and WO 90/10587. In each of them the conveyors disclosed show a general common configuration which comprises, at least, a supporting structure for, at least, two coplanar parallel tracks for supporting said flanges and apart from each other by a predetermined gap which defines a guide path of said bottles run; a plurality of blowing nozzles, distributed along each of said supporting tracks and located adjacent to them which provide air jets which propel the bottles; at least a pressurizable chamber communicated with said blowing nozzles; and at least an inlet for supplying compressed air to said chamber.

The conveyor disclosed in said patent WO 90/10587 stands out in that, with a general configuration as above disclosed, said air nozzles are arranged above and under a single pair of supporting tracks for the flange, therefore the air jets affect the area of the neck and upper part of the bottle neck. Said patent EP-A-0 705 777 discloses, on its hand, a conveyor likewise provided with a single pair of supporting tracks but, that, in addition to said blowing nozzles, which in this case are directed up to the upper part of the neck, the pressurizable chamber has passageways for air circulating and deflectors which distribute other air jets which impinge, in upwards and forwards direction on the part of the upper half of the bottle body.

These conveyors which have a single pair of supporting tracks, show the drawback that the stability of the bottles run is very sensitive to any unbalance or irregularity between the thrust power of the air jets which impinge on the areas located above and the areas located under the flange guiding said bottles, so that the bottles have a significant likelihood to rotate each other and to get clogged in the conveyor guide path.

Patent EP-0 070 931 shows a conveyor of above kind in which two pairs or tracks are present; one pair of lower support tracks and one pair of upper guiding tracks. In this example, however, the air jets impinge exclusively on an area of the bottle neck located above the flange. Therefore, the possible benefits arising from the advantage of having a double guiding track are lost because of the unbalance sustained by the areas of the bottles which receive the thrust of the air jets. Actually, as the thrust is exclusively carried out by the part located above the guiding area, that is to say, above the flange, the bottles tend to tilt forwards, so that the front part of said flange presses against the sliding surface of the lower supporting track and the rear part against the upper guiding track, the friction force negatively increasing contrary to the bottles running forwards which implies a significant loss of power which means an increase of the air, supply cost and the likelihood of irregularity in the carriage and even eventual obstructions.

It is to be noted that in this kind of equipment the clogged bottles means a serious drawback because to remove them the line has to be stopped and part of the pressurizable chamber and of the guides must be dismounted which means an unbearable stop of the whole bottle feeding line at a bottling section, which obliges to arrange backup auxiliary conveying lines.

Finally, said patent EP-A-0 790 200, of which this applicant is the proprietor, discloses a conveyor which incorporates a pair of lower supporting tracks and a pair of upper guiding tracks, and characterised in that the blowing nozzles are located at either side of the guide path formed by them so that the air jets impinge just on the bottle guiding area, that is to say, on the flange and neck areas immediately adjacent so that a very even bottle run is achieved because of an accurate guiding and a balanced thrust. The conveyor in addition comprises two of said pressurizable chambers, independently feeding the nozzles at either side of the guide path in order to allow that a third chamber is incorporated, in this case a suction chamber, in the space located immediately above said guide path for lightly and upwardly sucking the bottles favouring this way a diminution of the flange friction with the supporting track.

Although this arrangement at operating level evidenced to be fully effective and satisfactory, however it can be improved over all on the construction aspect. Actually, in this conveyor, as well as in the remaining conveyors considered, the pressurizable chamber or chambers feeding the blowing nozzles are made of a rigid material, generally metal sheet, which is expensive as a raw material, expensive to conform, namely if airtightness is required, because it implies cutting, folding and welding with some accurateness and that calls for bothersome mounting and dismounting and therefore, an also expensive general maintenance of the equipment.

Therefore, an object of this invention is to contribute with a pneumatic conveyor for empty lightweight bottles, comprising accurate guiding means, a balanced distribution of the thrust air jets and at least a pressurizable chamber and blowing nozzles cheap to construct and easy to mount and dismount which imply therefore low cost of production, mounting and maintenance.

Another object of this invention is to contribute with a conveyor of this kind which has in addition means allowing to quickly remove from the line of bottles eventually clogged, even without stopping the conveyor is required.

DISCLOSURE OF THE INVENTION

These objects are achieved in a pneumatic conveyor for empty lightweight bottles, according to this invention, contributing at least with a pressurizable chamber formed by means of an airtight removable wrapping, secured along the supporting structure of the conveyor by airtight, removable junction means so that a quick access is provided to the area for distributing air to the tracks for their cleaning, maintenance and eventual fitting and/or adjustment. Said removable wrapping is flexible, preferably made of canvas although it could also be any other laminar flexible and airtight material, as for example, plastic sheet, coated or impregnated paper, or even a thin metal sheet such as aluminium.

The conveyor according to this invention is suitable to incorporate just one of those wrappings, forming a single pressurizable chamber associated to the blowing nozzles arranged at either sides of the tracks, along all of them, in which case the area comprised between said tracks, within said chamber, is covered by a profile configuring a reversed channel to allow the passage of the bottle necks. This profile, on one hand, partly acts as supporting structure joining the tracks to each other and keeping the suitable distance for the guide path, and on the other hand, closing the pressurizable chamber at the area of said guide path.

In the event that it is considered of interest to have a free space available at the higher area of the guide path or even an access to said path from said area, as it is the case of the suction chamber disclosed at mentioned patent EP-A-0 790 200, of which this applicant is the proprietor, the conveyor according to the invention can incorporate two of said wrappings forming two side pressurizable chambers, each associated to the blowing nozzles arranged along one of the tracks. Here, the area comprised between said tracks is also covered at the top by a profile, although in this case said profile only acts as said partly supporting structure, so that, as it does not constitute a part of the chamber closing, it can be provided with opening having access to the guide path. In addition, as the two pressurizable chambers remain in a lateral position, the area located immediately above said profile remains clear.

The embodiment of said chamber or chambers in a flexible laminar material, such as for example, a tarpaulin, allows a significant diminution of the costs as well of production as of mounting and maintenance, because it is a cheap material, easy to work and with little requirements of conformation because it is easily adapted to possible unevenness of the conveyor design and it allows quick mounting and dismounting which carries a saving in maintenance because it allows an easy access to the area distributing the air to the blowing nozzles for their cleaning or repair and even an access located at a portion of said area by partly dismounting an edge of the wrapping.

In an example of preferred embodiment of the invention, said blowing nozzles are arranged between each of said two supporting tracks and each of other corresponding two parallel, coplanar tracks for higher guide of said flanges. Therefore, the air jets injected by the nozzles impinge just on the flange, which is guided as well by the lower part as by the higher part, and neck areas immediately adjacent, that is to say, on the guiding areas of the bottles, which confer to them a balanced thrust which carries a great forwards run evenness.

In order to cut down ever more the costs, the conveyor of the invention includes the assembly of blowing nozzles at either side of the guide path in two bodies, each sandwiched between each of said two supporting tracks and each of said two higher guiding tracks, the bodies of which are crossed by passageways communicated by one end with at least one of said pressurizable chambers and the other ends of which define said blowing nozzles.

Each of said bodies is obtained from cutting a large-sized plate formed by two superposed sheets, close to each other, joined by walls parallel to each other, which cooperate with said sheets for defining said passageways, which are configured such as cells open by the edges. Cutting said large-sized plate can be carried out obliquely to the walls, so that it forms with them a given angle, which can be selected depending on the working angle required for each application for the propelling air jets. Said large-sized plate is of plastic material and is obtained through extrusion, therefore the making of said bodies, including air passageways and blowing nozzles, results very simple and cheap.

In addition, by giving to said body a suitable height, its sandwiching between a lower supporting track and a higher guiding track provides a gap between the actual portions of said tracks suitable to the thickness of the flange of the bottle, with which no further adjustments are required, which facilitates mounting to a great extent, having a favourable repercussion on the costs of said mounting in addition to those of the further maintenance.

In order to provide the conveyor according to the invention with means allowing to easily withdraw any bottle eventually clogged in the line, in at least one of said sandwich composed, the higher guide track and the body are joined to the structure by rigid means, while the supporting track is joined to said structure by independent elastic means, so that any bottle which unintentionally is clogged within the guide path of said tracks could be immediately released forcing at hand said elastic joining means to take the supporting track apart.

The supporting structure in addition comprises two extensions, each joined by one side to one of said sandwiches composed of the tracks and the body of the nozzles and on the other hand to an edge of said pressurizable chamber, which is at least one, therefore said extensions also constitute part of said chamber closing. At least, one of said extensions is joined to at least one supporting element of the conveyor, such as a column or an overhanging fixed arm.

In addition, means have been provided for adjusting the passage of the air between said pressurizable chamber, which is at least one, and said blowing nozzles through the passageways of the body. Said means comprise obturating plates associated to said nozzle bodies which can be locked in a position selectable for partly obturing all the passageways or for totally and selectively obturating some of the passageways at regular intervals. On the other hand, said obturating plates can be moved and/or fixed to said hand selectable position, having access to them by previously dismounting said removable wrapping, they can be longitudinally guided and be moved and/or fixed to said selectable position by suitable driving means, such as an electric motor or a fluid dynamic cylinder.

Last, it has been foreseen that the conveyor according to the invention comprises several of said inlets of compressed air supply to the chamber, distributed along the conveyor depending on the length thereof, and that the equipment comprises its own blowing or compressing air means connected to said different inlets for supplying compressed air to the chamber.

Said means, which must provide a great air feed at a relatively low pressure, can be formed by a single blower or compressor capable to feed the whole line, with a feeding duct provided with a branch for each of the inlets of the chamber, or a plurality of small blowers or compressors connected each to one inlet for feeding a length of the chamber. However, it is obvious that the conveyor of the invention can also be fed from a compressed air plant already existing in an industrial premise in which it is integrated or pertaining to another machine to which it is associated.

SHORT DESCRIPTION OF THE DRAWINGS

For best understanding the invention, it is proceeded thereafter to disclose it through concrete examples of embodiment, the examples of which must not be interpreted as limitation but only illustrating, said description being supported with reference to the drawings attached in which.

DESCRIPTION OF THE PREFERRED EXEMPLARY EMBODIMENTS

Figure 1:
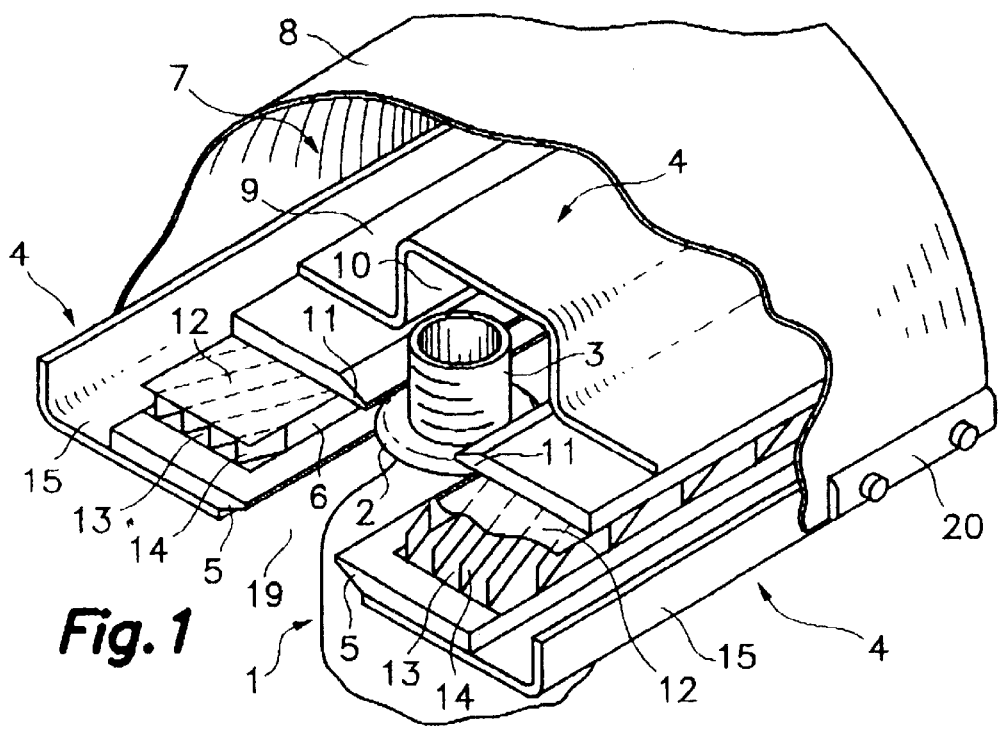
FIG. 1 is a view in perspective which diagrammatically shows the main elements composing the conveyor of the invention and the way in which they are arranged.

Referring first to FIG. 1 (see also FIGS. 3 and 4), numeral 1 designates a lightweight, empty bottle, typically in plastic material, incorporating a flange 2 at the area of its neck 3. The conveyor of the invention comprises a pair of parallel, coplanar supporting tracks 5, on each of which a body 12 is located which defines a plurality of outlet nozzles 6 along said track, and on each body 6 a second upper guiding track 11 is arranged. This way, the sandwiches formed by the tracks 5 and 11 with the body 12 interposed between them are arranged this way, said sandwiches 5, 11, 12 being separate by a gap sufficient for forming a guide path 19 for bottles 1, on which they are transferred, suspended, with the flanges 2 supported and sliding on the lower supporting tracks 5 and guided by the upper guiding tracks 11, under the thrust of compressed air jets ejected by the outlet nozzles 6 in a position favourable to the forwards run of the bottles 1 and which impinge just on the flange 2 and areas of the neck 3 immediately adjacent, providing a balanced thrust power.

The conveyor has a supporting structure 4 basically formed by a profile 9, which is joining both sandwiches 5, 11, 12 by the upper part forming a reversed channel 10 for the passage of the necks 3, and of lateral extensions 15, each joined by one side to a sandwich 5, 11, 12 and by the other to a end of a wrapping 8. At least one of said extensions 15 can be joined to a supporting element of the conveyor, such as a supporting column 18 or an overhanging mounted arm.

The wrapping 8 is of a flexible laminar material, airtight, such as a tarpaulin, and is joined to the ends of the extensions 15 by means of a tight junction 20 easy to dismount.

Figure 2:
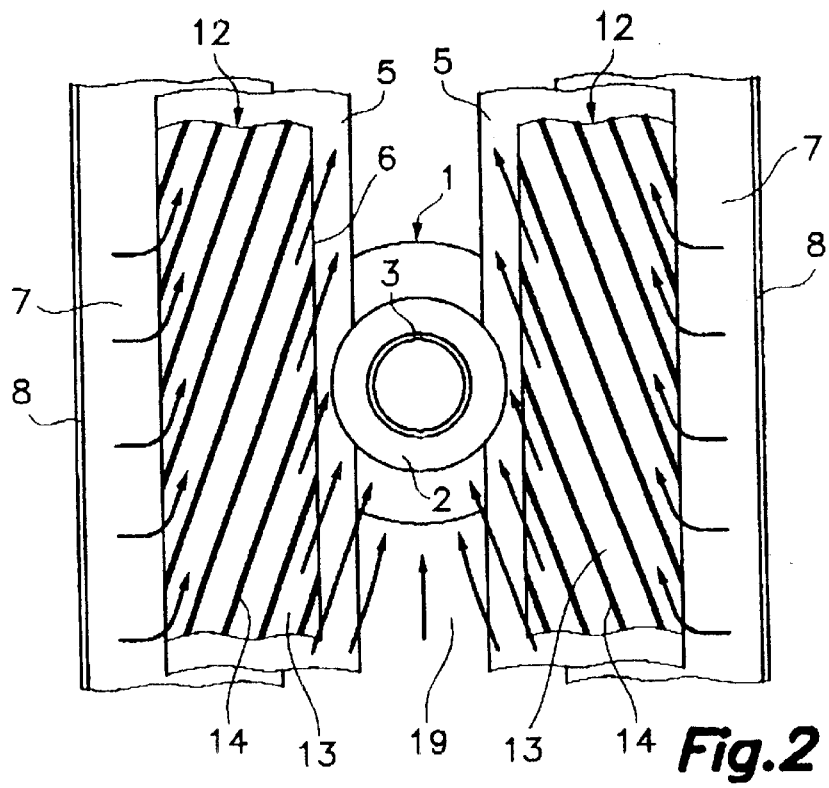
FIG. 2 is a plane view showing a flow diagram of the compressed air within the conveyor of FIG. 1.

This arrangement provides a pressurizable chamber 7 formed by the wrapping 8 and the elements of the supporting structure 4, that is to say, the profile 9 and the extensions 15. Said pressurizable chamber 7 has one or more inlets of compressed air supply (not shown) connected to blowing or compressing means which feed compressed air to said chamber 7. The compressed air from the interior of said chamber 7 is forced to pass through passageways 13 which cross the body 12, said passageways are communicated by one end with the chamber 7 and define by the other said blowing nozzles 6, producing air jets (shown with an arrow in FIG. 2) which impinge, as it has been said before, on the flange area 2 of the bottles 1 in a direction favourable to the forwards run thereof.

For providing the air jets with said direction favourable to the forwards run of the bottles, said passageways 13 of the body 12 shows an oblique inclination with respect to the guide path 19. It is achieved, according to the invention obtaining the bodies 12 from cutting a large-sized plate formed by two superposed sheets, close to each other, joined by walls parallel to each other, which co-operates with said sheets for defining said passageways 13, which are configured as cells. Cutting this large-sized plate can be carried out obliquely to the walls, so that bodies 12 are obtained with the passageways 13 oriented in a given angle, selectable depending on the working angle required at each application for the propelling air jets.

Said large-sized plate is typically of plastic material and is obtained through extrusion and a thickness is provided to it suitable to the gap required for the passage of the flange 2 between the supporting tracks 5 and the upper guiding tracks 11.

In an embodiment not illustrated of the invention, the conveyor includes means, above disclosed, for regulating the air output through the blowing nozzles 6 based on the part obturation of all the passageways 13 at one time or in the total selective obturation of some passageways 13 distributed at regular intervals.

Figure 3:
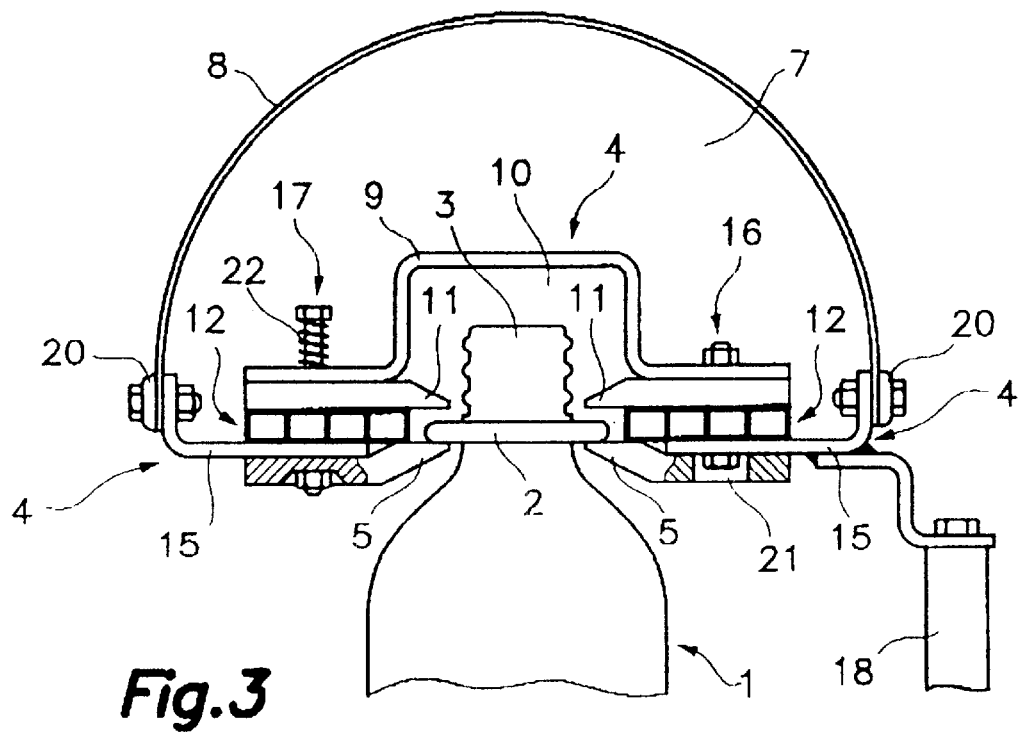
FIGS. 3 and 4 are two front, partly sectional views, which illustrate a conveyor according to the invention which incorporates, in addition, a device for allowing the withdrawal of the bottles eventually clogged within the guide path, being shown in a normal operating position and in a position which allows to withdraw them, respectively.
Figure 4:
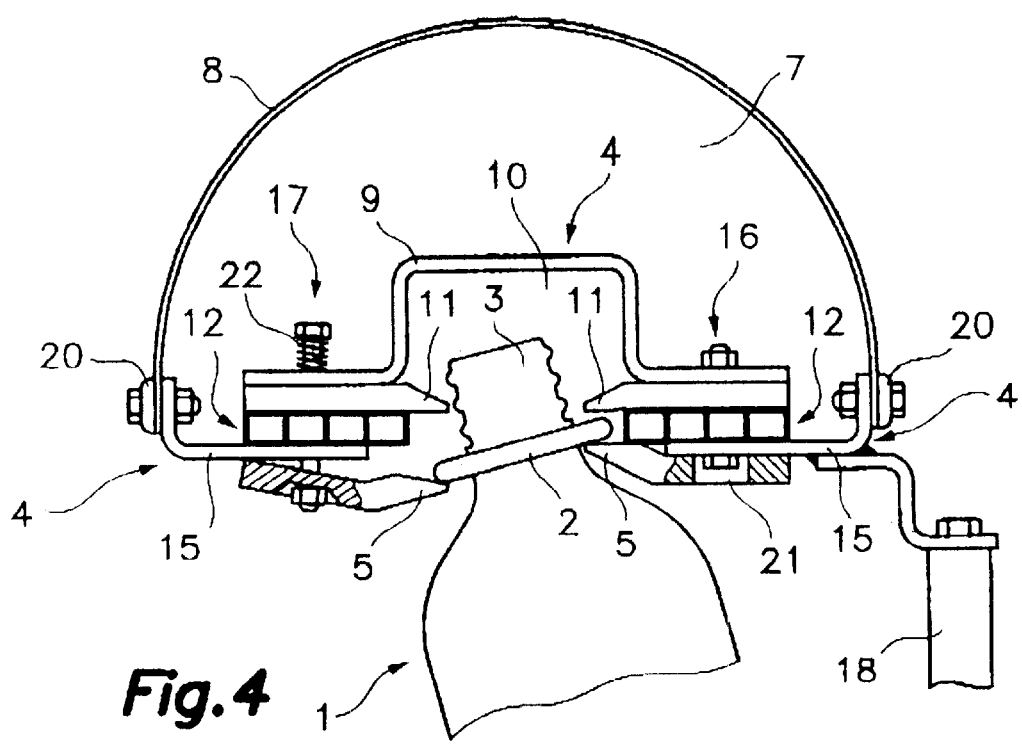

Considering now FIGS. 3 and 4, it can be seen in them same elements disclosed up to now, but with the addition of the device for allowing the withdrawal of any bottle 1 which can be eventually clogged in the guide path 19.

The device is characterised in that, at least at one of said sandwiches 5, 11, 12, the upper guiding track 11 and the body 12 are joined to the structure 4, that is to say, the profile 9 and the extension 15, by rigid means 16, while the supporting track 5 is joined to said structure 4 by elastic, independent means 17, so that any bottle 1 which unintentionally would get clogged within the guide path 19 for said tracks 5, 11 could be immediately released by forcing at hand said elastic joining means 17 for separating the supporting track 5, even without stopping the line.

In this example of embodiment, in order to make the rigid locking means 16 with the elastic locking means 17, the parts forming the supporting track 5 are provided with two series of alternate holes. A first series is formed by relatively large-sized holes 21 (illustrated in the track at the right of FIGS. 3 and 4), sufficient for allowing the passage, for example of the head of a screw or a nut integrating the rigid locking means 16, while the second series is formed by holes which only allows the passage, for example, of a bolt which grips a spring 22 (illustrated in the track 5 at the left of FIGS. 3 and 4), said bolt has a head or nut which does not pass through said hole, so that when forcing by hand the bottle 1, or directly the track 5 (FIG. 4), this later is taken apart form the sandwich 5, 11, 12, compressing the spring 22, and allowing to release the bottle 1, without affecting the rigid locking means 16, which pass through the hole 21, which remain inalterably joining said sandwich 11, 12 together with the supporting structure 4, that is to say, profile 9 and extensions 15. When the force exerted on the track 5 during the withdrawal of the clogged bottle 1, the spring 22 recovers its initial shape newly relocating the supporting track 5 to its position of normal operation (FIG. 3).

It is obvious that one skilled in the art could carry out multiple changes and modifications in the conveyor without departing from the scope of this invention, which is defined by appended claims.

What is claimed is:

1. Pneumatic conveyor for empty, lightweight bottles (1), of the kind having a support flange (2) in an area of its neck (3), said conveyor comprising:

a supporting structure (4) for at least two parallel, coplanar supporting tracks (5) for said flange (2), said tracks (5) being separate by a gap wide enough to define a guide path (19) for the travel of said bottles (1), and other two parallel, coplanar tracks (11) opposed to said supporting tracks (5) for upper guiding of said flanges (2);

a plurality of blowing nozzles (6) arranged between the supporting tracks (5) and said corresponding guiding tracks (11), said blowing nozzles (6) being distributed along and adjacent to each of the said supporting tracks (5), both sides of said guide path (19) to provide air jets for propelling the bottles (1) at said area of the neck (3);

at least one pressurizable chamber (7) communicated with said blowing nozzles (6); and at least an inlet for supplying compressed air to said chamber (7), characterized in that it comprises two bodies (12), each sandwiched between one of said two supporting tracks (5) and the corresponding one of said two upper guiding tracks (11), said bodies (12) being crossed by passageways (13) which are communicated at one end with said at least one pressurizable chamber (7) and defining at the other end said blowing nozzles (6).

2. A conveyor, according to claim 1, characterised in that each of said bodies (12) is an obliquely cut portion of an extruded large-sized plate comprised of two superposed sheets, close to each other, joined by walls (14) parallel to each other, which co-operate with said sheets to define said passageways (13), said walls (14) forming in said bodies (12) a given angle about the guide path (19) selected depending on the working angle required at each application for the propelling air jets.

3. A conveyor, according to claim 1, characterised in that, in at least one of said sandwiches composed of tracks (5, 11) and body (12), the upper guiding track (11) and the body (12) are joined to the structure (4) by rigid means (16), while the supporting track (5) is joined to said structure (4) by independent elastic means (17), so that any bottle which unintentionally would get clogged at the guiding path (19) could be immediately released manually forcing said elastic joining means (17) for taking the supporting track apart (5).

4. A conveyor, according to claim 1, characterised in that said supporting structure (4) further comprises two extensions (15), each joined at one hand to one of said sandwiches composed of tracks (5, 11) and body (12) and at the other hand to an edge of said at least one pressurizable chamber (7), said extension (15) remaining connected to at least one supporting column (18) of the conveyor.

5. A conveyor, according to claim 1, characterised in that it further comprises means for regulating the air passage between said at least one pressurizable chamber (7) and said blowing nozzles (6) through the passageways (13) of the body (12), said means comprising obturating plates associated to said bodies (12) which can be locked at a selected position for selectively obturating some of the passageways (13) at regular intervals.

6. A conveyor, according to claim 1, characterised in that it comprises several of said inlets for supplying compressed air to said pressurizable chamber (7) distributed along the conveyor, depending on the length thereof.

7. A conveyor, according to claim 6, characterised in that it comprises its own blowing or air compressing means connected to said several inlets for supplying compressed air to chamber (7).

8. A conveyor, according to claim 1, characterised in that it further comprises means for regulating the air passage between said at least one pressurizable chamber (7) and said blowing nozzles (6) through the passageways (13) of the body (12), said means comprising obturating plates associated to said bodies (12) which can be locked at a selected position to partly obturate all the passageways (13).

9. A conveyor, according to claim 8, characterised in that said obturating plates are manually movable to and/or lockable at said selected position, said plates being accessible by previously dismounting said removable wrapping (8).

10. A conveyor, according to claim 8, characterised in that said obturating plates are longitudinally guided and are movable to and/or lockable at said selected position by suitable operating means such as an electric motor or a fluid dynamic cylinder.

11. A conveyor, according to claim 1, characterised in that said at least one pressurizable chamber (7) is formed by a removable, airtight wrapping (8), secured along said supporting structure (4) of the conveyor by airtight, removable junction means (20) so that a quick access is provided to said blowing nozzles (6) that distributes air along the tracks (5, 11) for a cleaning, maintenance and eventual adjustment and/or regulation thereof.

12. A conveyor, according to claim 11, characterised in that said removable wrapping (8) is flexible.

13. A conveyor, according to claim 12, characterised in said flexible wrapping (8) is a tarpaulin.

14. A conveyor, according to claim 11, characterised in that it comprises one unique wrapping (8) forming a single pressurizable chamber (7) associated to said blowing nozzles (6) along both tracks (5, 11).

15. A conveyor, according to claim 14, characterised in that the area comprised between said tracks (5, 11), within said pressurizable chamber (7), is covered by a profile (9) configuring a reversed channel (10) for allowing the passage of the bottle (1) necks (3), said profile (9) partly acting as the supporting structure (4) and partly for closing the pressurizable chamber (7).

16. A conveyor, according to claim 11, characterised in that it comprises two wrappings (8a) forming two pressurizable chambers (7a), each associated to the blowing nozzles (6) arranged along one of said tracks (5, 11).

17. A conveyor, according to claim 16, characterised in that the area comprised between said tracks (5, 11) is covered at the top by a profile (9), said profile partly acting as the supporting structure (4).

\* \* \* \* \*